A. BROMAN.

Coffee-Roasters.

No. 133,625.  Patented Dec. 3, 1872.

Witnesses:
James O. Hutchinson
C. L. Evert

Inventor.
Andrew Broman
per Alexander Duster
Attorneys.

UNITED STATES PATENT OFFICE.

ANDREW BROMAN, OF KEWANEE, ILLINOIS.

IMPROVEMENT IN COFFEE-ROASTERS.

Specification forming part of Letters Patent No. 133,625, dated December 3, 1872.

*To all whom it may concern:*

Be it known that I, ANDREW BROMAN, of Kewanee, in the county of Henry and in the State of Illinois, have invented certain new and useful Improvements in Coffee, Pop-Corn, and Peanut Roaster; and do hereby declare that the following is a full, clear, and exact description thereof, reference being had to the accompanying drawing and to the letters of reference marked thereon making a part of this specification.

The nature of my invention consists in a coffee, pop-corn, and peanut roaster in which a pan is provided with a central post to which radial and downward-projecting arms are used, said post having a gear-wheel at its top which extends through an orifice in the lid, which latter is hinged to the pan, and is provided with a journaled shaft having a gear-wheel and crank for operating the stirrers, all as more fully hereinafter set forth.

In order to enable others skilled in the art to which my invention appertains to make and use the same, I will now proceed to describe its construction and operation, referring to the annexed drawing, in which—

Figure 1:
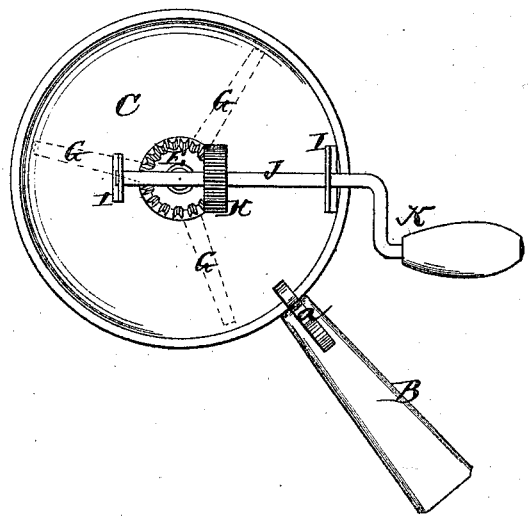
Figure 2:
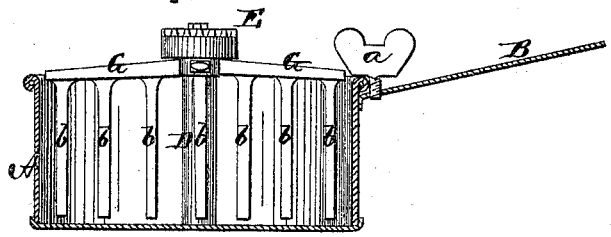

Figure 1 is a plan view, and Fig. 2 a longitudinal vertical section, of my machine.

A represents a circular pan of any suitable dimensions, provided with a handle, B, and a hinged lid, C, the lid being hinged directly opposite to the handle, so that when the lid is shut down it can be fastened by a suitable catch, a, on the handle. In the center of the pan A is an upright post, D, upon the upper end of which is a hub, E, provided with cogs on its upper side. The hub E rests on a shoulder or offset on the post D, and is provided with two, three, or more radiating arms, G G, from each of which a series of teeth, b b, extend downward to near the bottom of the pan. In the center of the lid C is a circular aperture, through which the cogged hub E projects, and a pinion, H, gears with said hub. This pinion is placed on a horizontal shaft, J, having its bearings in posts I I attached to the lid C, and this shaft is on its outer end provided with a crank, K, for turning the same.

The coffee, peanuts, or pop-corn being placed in the pan A and the lid closed they are stirred during the process of roasting by turning the crank K, which revolves the hub E with its arms and teeth.

Having thus fully described my invention, what I claim as new, and desire to secure by Letters Patent, is—

The combination of the pan A, center post D, cogged hub E, arms G G, teeth b b, hinged lid C, shaft J, with crank K and pinion H, all constructed and arranged substantially as and for the purposes herein set forth.

In testimony that I claim the foregoing I have hereunto set my hand this 15th day of June, 1872.

ANDREW BROMAN.

Witnesses:
 JOHN A. REGNELL,
 A. E. UHLIN.